United States Patent [19]

Chen et al.

[11] Patent Number: 5,438,251

[45] Date of Patent: Aug. 1, 1995

[54] SAFETY CHARGING CONNECTOR FOR AUTOMOBILES

[75] Inventors: Chern-Lin Chen; Jea-Sen Lin, both of Taipei, Taiwan

[73] Assignee: Windsor Chou, Alhambra, Calif.

[21] Appl. No.: 77,777

[22] Filed: Jun. 18, 1993

[51] Int. Cl.⁶ .............................................. H02J 7/00
[52] U.S. Cl. ................................. 320/25; 439/504
[58] Field of Search ................... 320/25, 48; 439/504

[56] References Cited

U.S. PATENT DOCUMENTS

| | | | |
|---|---|---|---|
| 4,607,209 | 8/1986 | Guim et al. | 320/25 |
| 4,663,579 | 5/1987 | Yang | 320/26 |
| 4,757,250 | 7/1988 | Guim et al. | 320/25 |
| 4,855,662 | 8/1989 | Yang | 320/25 |
| 5,103,155 | 4/1992 | Joannou | 320/26 |
| 5,189,359 | 2/1993 | Kronberg | 320/26 |

*Primary Examiner*—Thomas M. Dougherty
*Assistant Examiner*—Robert Nappi
*Attorney, Agent, or Firm*—Pascal & Associates

[57] ABSTRACT

A safety charging connector is provided for connecting two batteries of two automobiles. The safety charging connector comprises four contact terminals each for contacting a different electrode of one of the two batteries, a relay switch for rendering conduction among the contact terminals, and a control circuit for controlling the conduction of the relay switch; the control circuit includes four sub-circuits each of which is serially connected between the relay switch and one of the four terminals.

7 Claims, 1 Drawing Sheet

SAFETY CHARGING CONNECTOR FOR AUTOMOBILES

FIELD OF THE INVENTION

The present invention relates to a safety-charging connector for automobiles.

BACKGROUND OF THE INVENTION

It is well known that when an engine of an automobile is not able to be started due to insufficient electric power, a battery of the automobile can be charged by power from a battery of another automobile to thereby start the engine.

To charge the battery of the automobile which is of insufficient electric power by power from a battery of another automobile one must connect the two batteries through a pair of electric wires. This, however, is very dangerous to one who is not familiar with electricity. A battery has a small internal resistance, and there is a voltage difference between a battery with sufficient electric power and a battery without sufficient electric power. Hence, even if the two batteries are connected correctly (which means that electrodes of corresponding polarities are connected respectively), a large current will pass through the electric wires. If the two batteries are connected erroneously (which means that electrodes of the two batteries are not correspondingly connected, or one or both of the batteries are short-circuited), a current which passes through the electric wires will be 10 to 20 times larger than the current existing on the electric wires when the batteries are correctly connected. Under such circumstances the battery(ies) may be damaged, and most important of all, a person who handles the connection between the batteries may get hurt.

It is thus desired to have a device which can be used to connect the two batteries safely;

The device is referred to here as a "safety charging connector".

SUMMARY OF THE INVENTION

It is an object of the present invention to provide a safety charging connector for connecting two batteries of two automobiles, which can avoid risk resulting from incorrect connection between the two batteries or short-circuit of one or both of the batteries.

Another object of the present application is to provide a safety charging connector which conducts two batteries of two automobiles with one the other only when the two batteries are correctly connected.

According to the present invention, a safety charging connector comprises four contact terminals each for contacting a different electrode of one of the two batteries, a relay switch for rendering conduction among the contact terminals, and a control circuit for controlling the conduction of the relay switch; the control circuit includes four sub-circuits each of which is serially connected between the relay switch and one of the four terminals.

The relay switch may be further provided with a parallelly connected indicator (which may be an LED) to indicate the situation as to whether the charging connector is in a condition of conduction or not. The term "conduction" used here means that current between the two batteries of the two automobiles is conducted through the charging connector.

The charging connector may be further provided with a protection circuit to prevent the connector from being damaged in case the connector is incorrectly used.

BRIEF DESCRIPTION OF THE FIGURES

The above and other objects, features and effects of the present invention may be further understood from the following detailed description of a preferred embodiment with reference to an accompanying figure.

DETAILED DESCRIPTION OF A PREFERRED EMBODIMENT

Figure 1:
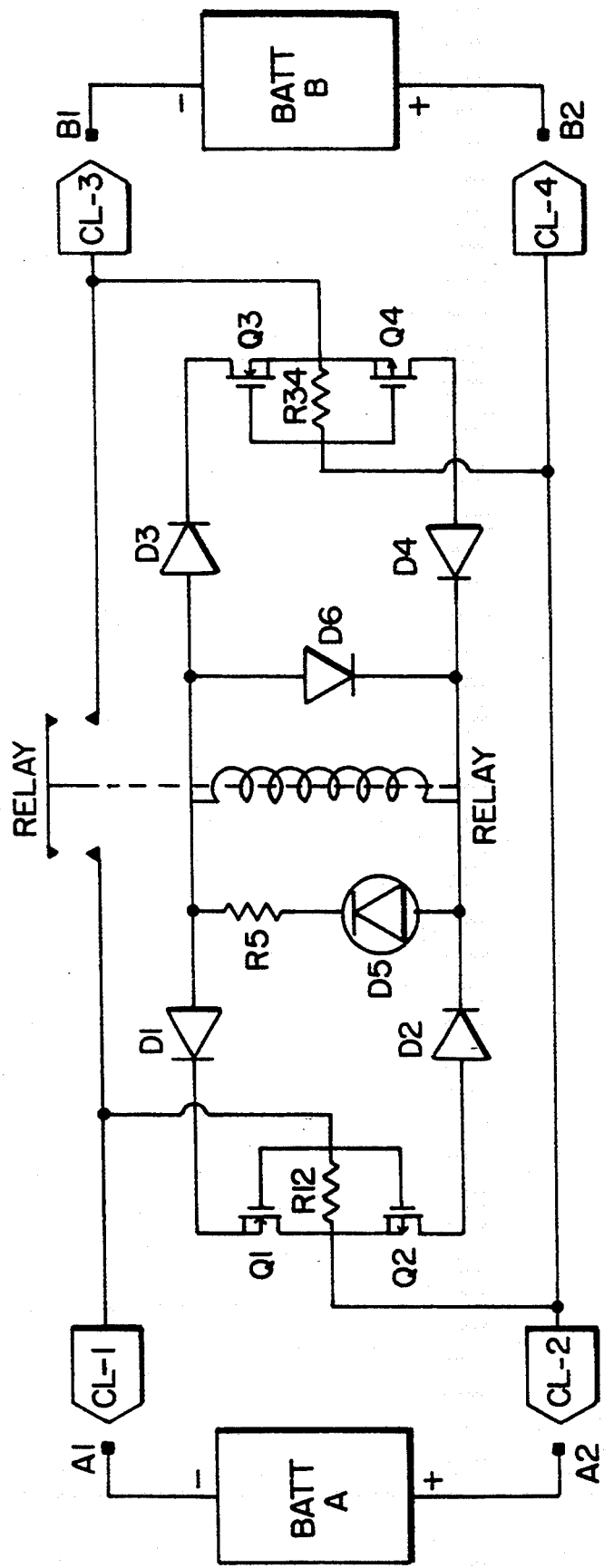
FIG. 1 shows a circuit diagram of an embodiment of the safety connector according to the present invention.

The present invention will be described with reference to the embodiment shown in FIG. 1. FIG. 1 represents and embodiment according to the present invention, in which Q1 and Q3 are N-type MOSFETs; Q2 and Q4 are F-type MOSFETs; D1, D2, D3, D4, D6, are diodes; D5 is an LED (light emitted diode), which is connected in series with a resistor R5; R12 and R34 are resistors; RELAY is a relay switch, which includes a coil C and a switch S; and CL-1, CL-2, CL-3 and CL-4 are connect terminals, which may be clips, clamps, claws or the like for contracting electrodes of batteries of two automobiles. Blocks BATT A and BATT B represent batteries of two automobiles. The batteries are not expressed by general symbols for batteries because the polarities of their electrodes are unknown. Each of the two solid blocks has two terminals (A1, A2, B1, and B2), each of which represents one of the electrodes of one of the batteries.

In actual use, a person who intends to charge one of the batteries by power from the other one of the batteries may arbitrarily connect contact terminals CL-1 and CL-2 with electrodes of one battery and contact terminals CL-3 and CL-4 with electrodes of the other battery. One of four possible situations may occur. The four possible situations are listed in Table I and will be analyzed below.

TABLE I

| Polarity | | | | Transistor | | | | Diode | | | | LED/ |
|---|---|---|---|---|---|---|---|---|---|---|---|---|
| A1 | A2 | B1 | B2 | Q1 | Q2 | Q3 | Q4 | D1 | D2 | D3 | D4 | RELAY |
| (1) + | − | + | − | V | X | X | V | V | X | X | V | V |
| (2) − | + | − | + | X | V | V | X | X | V | V | X | V |
| (3) + | − | − | + | V | X | V | X | X | X | X | X | X |
| (4) − | + | + | − | X | V | X | V | X | X | X | X | X |

(wherein V stands for ON and X stands for OFF.)

SITUATION 1. The polarities of A1, A2, B1, and B2 are, in the order, +, −, +, and −, respectively.

In this situation, the two batteries are correctly connected. FETs Q1 and Q4 are forwardly biased (ON) and diodes D1 and D4 are connected (ON). The other FETs Q2 and Q3 and diodes D2 and D3 are OFF. A current passes through the coil C of the relay switch RELAY; the relay is thus operative to close the switch S. Consequently, the batteries BATT A and BATT B are conducted and the LED D5 is shining the indicates that the charging connector is in a condition of conduction.

SITUATION 2. The polarities of A1, A2, B1, and B2 are in the order, −, +, −, and +, respectively.

In this situation, the two batteries are correctly connected. FETs Q2 and Q3 are ON and diodes D2 and D3 are ON. The other FETs Q1 and Q4 and diodes D1 and D4 are OFF. A current passes through the coil C of the relay switch RELAY; the relay is thus operative to close the switch S. Consequently, the batteries BATT A and BATT B are conducted and the LED D5 is shining to indicate that the charging connector is in a condition of conduction.

SITUATION 3. The polarities of A1, A2, B1, and B2 are, in the order, +, −, −, and +, respectively.

In this situation, the two batteries are incorrectly connected. FETs Q1 and Q3 are ON but FETs Q2 and Q4 and diodes D1–D4 are OFF. No current passes through the coil C of the relay switch RELAY; the relay is thus inoperative and the switch S is opened. Consequently, the charging connector is not in a condition of conduction. The batteries BATT A and BATT B are not conducted and the LED D5 does not shine.

SITUATION 4. The polarities of A1, A2, B1, and B2 are, in the order, −, +, +, and −, respectively.

In this situation, the two batteries are incorrectly connected. FETs Q2 and Q4 are ON but FETs Q1 and A3 and diodes D1–D4 are OFF. No current passes through the coil C of the relay switch RELAY; the relay is thus inoperative and the switch S is opened. Consequently, the charging connector is not in a condition of conduction. The batteries BATT A and BATT B are not conducted and the LED D5 does not shine.

It may be seen from the foregoing analysis that the charging connector conducts the two batteries only when they are correctly connected.

Now let us consider the situations where one or both of the batteries are short-circuited. Short-circuit may occur when one, for example, incorrectly connects contact terminals CL-1 and CL-2 (or CL-3 and CL-4) both to the same electrode of a battery; or, one of the batteries may be internally short-circuited (internal short-circuit may the very reason why the batty malfunctions and can not provide sufficient electric power).

When contact terminals CL-1 and CL-2 are short-circuited, or when electrodes A1 and A2 are short-circuited, FETs Q1 and Q2 are not biased, and thus FETs Q1 and Q2 are OFF. Similarly, when contact terminals CL-3 and CL-4 are short-circuited, or when electrodes B1 and B2 are short-circuited, FETs Q3 and Q4 are not biased, and thus FETs Q3 and Q4 are OFF. In either or both of the above situations, there is not formed a current path passing through the coil C of the relay switch, and therefore the switch S of the relay switch is not closed and the charging connector does not conduct the two batteries.

The above shows that the charging connector does not conduct the two batteries when short-circuit occurs.

Resistors R12 and R34 in the figure represent bias resistors for the FETs.

To protect the circuit of the charging connector, a diode D6 may be additionally provided; it may be connected in parallel with the coil C of the relay. In case the relay is not conducting, the diode D6 forms a by-pass circuit to by-pass any current that may be accidentally generated and prevents the current from damaging the circuit of the charging connector.

Thus the safety charging connector for connecting two batteries of two automobiles is comprises of four contact terminals, each for contacting a different electrode of the two batteries. A switch apparatus renders conduction between the contact terminals. Control apparatus controls the conduction of the switching apparatus. Four control sub-circuits each is serially connected between the switching apparatus and one of the four terminals.

The control sub-circuits are comprises of a first pair of diode apparatus connected in the same polarity direction to opposite terminals of the control apparatus, and a second pair of diode apparatus connected in the same polarity direction to opposite terminals of the control apparatus, but in opposite polarity direction to the first pair of diode apparatus. Switching apparatus connected to the diodes and contact terminals detects the polarity of the voltage across pairs of the contact terminals for passing current through either one of the pairs of diodes and the control apparatus in the condition of similar voltage polarities of the batteries applied to opposite corresponding ones of the contact terminals, whereby the opposite corresponding ones of the contact terminals to which similar polarities of the batteries are connected, are connected together via the switch apparatus, and for inhibiting conduction of current through the control apparatus in the event similar voltage polarities of the batteries are not applied to opposite corresponding ones of the contact terminals.

Preferably each of the switching apparatus for detecting the polarity is comprised of a transistor, preferably a field effect transistor.

The contents of the present invention have been described as above. However, it should be noted that the above description about the preferred embodiment is for illustration rather than limitation. Various modification can be made by one skilled in this art without departing from the spirit and scope of the invention. For example, it is not necessary to use MOSFETs for Q1–Q4; other types of transistors can be used without degrading the effect of the invention. Likely, it is not necessary to use a relay switch; some other type of switch can be used. These and other equivalents should below to the scope of the present invention as defined by the claims.

We claim:

1. A safety charging connector for connecting two batteries of two automobiles, comprising:
   (a) four contact terminals each for contacting a different electrode of said two batteries,
   (b) first switching means for rendering conduction among said contact terminals,
   (c) control means for controlling said conduction of said switching means,
   (d) four control sub-circuits each serially connected between said control means and one of said four terminals, and
   (e) said control sub-circuits being comprised of a first pair of diode means connected in the same polarity direction to opposite terminals of the control means, and a second pair of diode means connected in the same polarity direction to opposite terminals of the control means but in opposite polarity direction than the first pair of diode means, and second switching means connected to said diodes and contact terminals for detecting the polarity of voltage across pairs of the contact terminals for passing current through either one of the pairs of diode means and the control means in the condition of similar voltage polarities of the batteries being applied to opposite corresponding ones of the contact terminals, whereby the opposite corresponding ones of the contact terminals to which similar polarities of the batteries are connected, are connected together via the first switch means, and for inhibiting conduction of current through the control means in the event similar voltage polarities of the batteries are not applied to opposite corresponding ones of the contact terminals.

2. A safety charging connector as claimed in claim 1, in which said first switch means comprises a relay contact.

3. A safety charging connector as claimed in claim 2, in which said control means further comprises a protection circuit connected in parallel with a coil of the relay.

4. A safety charging connector as claimed in claim 3, in which said protection circuit comprises a diode.

5. A safety charging connector as claimed in claim 1, in which said control means further comprises an indicator for indicating whether said connector is in a condition of conduction or not.

6. A safety charging connector as claimed in claim 5, in which said indicator comprises an LED.

7. A safety charging connector as claimed in claim 1, in which said second switching means for detecting said polarity comprises at least one of a plurality of transistors.

* * * * *